G. W. SLOANE.

FEED WATER HEATER.

No. 10,427. Reissued Dec. 18, 1883.

WITNESSES:

William Miller

Otto Hufeland

INVENTOR

George W. Sloane.

BY Van Santvoord & Hauff

ATTORNEYS

N. PETERS, Photo-Lithographer, Washington, D. C.

UNITED STATES PATENT OFFICE.

GEORGE W. SLOANE, OF BROOKLYN, NEW YORK.

FEED-WATER HEATER.

SPECIFICATION forming part of Reissued Letters Patent No. 10,427, dated December 18, 1883.

Original No. 248,516, dated October 18, 1881. Application for reissue filed October 22, 1883.

*To all whom it may concern:*

Be it known that I, GEORGE W. SLOANE, a citizen of the United States, residing at Brooklyn, in the county of Kings and State of New York, have invented new and useful Improvements in Feed-Water Heaters, of which the following is a specification.

The object of this invention is to facilitate the heating of feed-water for steam-boilers and to utilize the feed-water heater for generating steam.

The invention consists in the combination, with a steam-boiler, of an apparatus composed of a drum which connects with the water-space of the boiler, a chamber which connects with the steam-space of the boiler, and a series of pipes which connect the drum and the chamber, said pipes, as well as the drum and the chamber, being exposed to the heat of the fire, and a feed-water pipe entering the drum and adapted to connect with a pump or water-reservoir for introducing the feed-water directly into the drum, whereby the feed-water is heated and the generation of steam materially facilitated.

The invention also consists of other features, which will be hereinafter described and claimed, reference being had to the accompanying drawings, in which—

Figure 1:
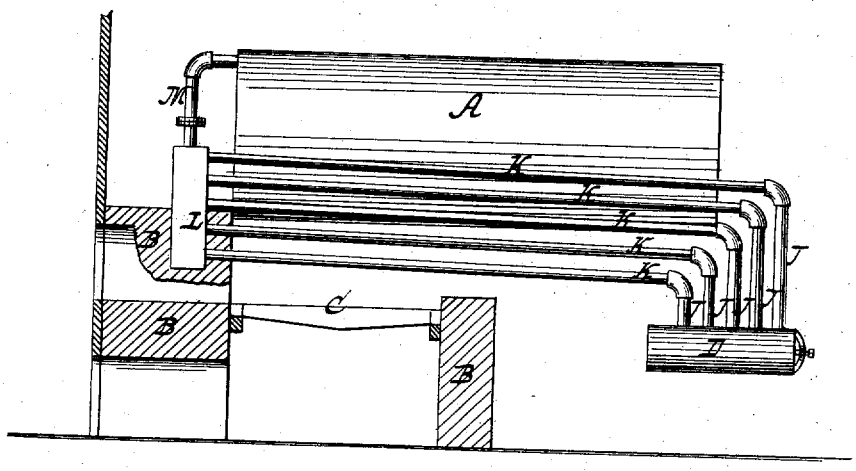
Figure 2:
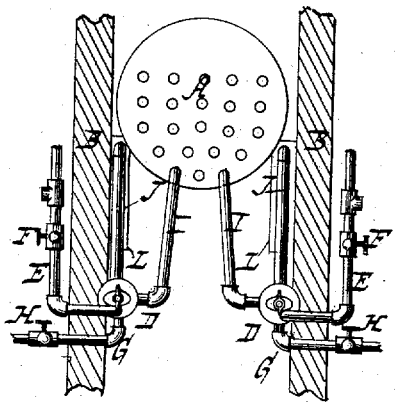
Figure 3:
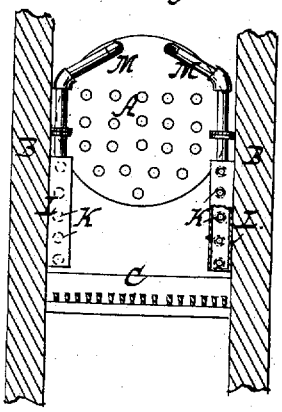

Figure 1 is a side elevation, the furnace-walls being in section. Fig. 2 is a rear view. Fig. 3 is a front view, the furnace-walls and grate-bars being in section.

Similar letters indicate corresponding parts.

In the drawings, the letter A designates a steam-boiler, B the furnace-walls, and C the grate-bars, about the construction of which there is nothing new.

D is a drum, which is placed below and partially in the rear of the boiler A, inside the furnace-walls, so that it is exposed to the action of the fire, and which is designed to serve as a feed-water receiver, and also as a mud-drum. Water is introduced into the drum through the pipe E, from a pump or other water-reservoir, said pipe being provided with a stop-cock or valve, F, in the ordinary manner. The drum D is emptied and cleaned through the blow-off pipe G, which is connected with the lower part of said drum, and is provided with a stop-cock or valve, H, in the ordinary manner. With the drum D is connected the lower end of a pipe, I, the upper end of which is connected with the lower part of the water-space of the boiler A.

L is a chamber, which is situated in front of the boiler, and which is connected to the drum D by a series of pipes, K J, said chamber and connecting-pipes being exposed to the heat of the fire.

By referring to Fig. 1 of the drawings, the position of the pipes K J in relation to each other and to the drum D and chamber L will be readily understood.

From the upper part of the chamber L extends a pipe, M, to the steam-space of the boiler A.

If desired, the apparatus above described may be duplicated, as shown in the drawings.

With this construction, the drum D, the pipes K, J, and M, and the chamber L being placed within the fire-chambers, and thus fully exposed to the heat, the water within said drum, pipes, and chamber will be quickly heated, and steam will be rapidly and freely generated, and will pass into the steam-space of the boiler, so that the capacity of the boiler to generate steam will be greatly increased without increasing the size of the boiler. With this construction, also, the boiler will not be cooled and the steam within it condensed by the introduction of feed-water.

What I claim as new, and desire to secure by Letters Patent, is—

1. The combination, with the steam-boiler, of the drum connected with the water-space of the boiler, a feed-water pipe, E, connecting with the drum for supplying the latter with feed from a pump or reservoir, a rear chamber, L, connected with the steam-space of the boiler at a point above the water-level, and pipes J K, connecting the rear chamber with the drum, substantially as and for the purpose described.

2. In a combined feed-water heater and steam-generator, the combination, with the boiler A, of the drum D, provided with the feed-water inlet-pipe E and blow-off pipe G, the upright chamber L, and the pipes I, J, K, and M, substantially as shown, and for the purpose described.

3. In a combined feed-water heater and steam-generator, the combination, with the boiler A, of the drums D, provided with the inlet-pipes E and the blow-off pipes G, the connections L, and pipes I J K M, substantially as herein shown and described, whereby the feed-water is heated and the steam-generating capacity of the boiler is increased, substantially as described.

In testimony whereof I have hereunto set my hand and seal in the presence of two subscribing witnesses.

GEORGE W. SLOANE. [L. S.]

Witnesses:
W. HAUFF,
JAMES L. NORRIS.